Patented June 17, 1952

2,600,457

UNITED STATES PATENT OFFICE 2,600,457

COPOLYMERS OF FATTY OIL MODIFIED POLYESTERS AND VINYL MONOMERS

John Wynstra, Bloomfield, N. J., assignor to Union Carbide and Carbon Corporation, a corporation of New York No Drawing. Application February 28, 1950, Serial No. 146,929

12 Claims. (Cl. 260—22)

This invention relates to copolymers of fatty oil modified polyesters and vinyl monomers having particular utility as fast air drying and baking-type coating vehicles. More particularly, it relates to soluble and fusible copolymers prepared by copolymerizing under conditions precluding gelation, certain vinyl monomers, for example styrene, and a fatty oil modified resinous polyester which is obtained by co-esterifying a polyhydric alcohol, a fatty oil substantially free from conjugated double bonds or the fatty acids derived therefrom, and certain dibasic adducts, for instance, the adduct of maleic anhydride and cyclopentadiene, also known as cis-3,6-endomethylene delta-4-tetrahydrophthalic anhydride.

Heretofore, it has been known that vinyl monomers such as styrene, when heated in admixture with polyesters prepared by esterifying a polyhydric alcohol and an unsaturated dibasic acid such as maleic or fumaric, reacted rapidly to form infusible gels which were generally insoluble in solvents for unmodified polystyrene or the polyesters. It is also known that fatty acid or fatty oil modified esters of unsaturated dibasic adducts and polyhydric alcohols form an insoluble copolymer when heated in admixture with vinyl monomers such as styrene. The infusible gels are not suitable for coating purposes in view of their insolubility in conventional organic solvents. On the other hand, an unreacted mixture of vinyl monomer and a polyester resin prepared from polyhydric alcohol and an unsaturated dicarboxylic acid has limited usefulness as a coating vehicle in that heating is required to set the coating by copolymerization of the ingredients, and nearly all of the vinyl monomer escapes by volatilization when heated under such conditions.

As one of the objects of the present invention, it is proposed to copolymerize selected vinyl monomers with fatty oil modified polyesters in a manner avoiding gelation and yielding fusible copolymers soluble in at least some one or more organic solvents, which are solvents for the polymers of the vinyl monomers polymerized in the absence of the polyester.

Another object of the present invention is the more rapid production of such fusible and soluble copolymers by the use of suitable catalysts.

Still another object is the preparation of coating vehicles capable of drying to hard adherent coatings by volatilization at room temperature of the solvent or solvents in the vehicle.

These and other objects as will be hereinafter apparent are accomplished by copolymerizing in the presence of a solvent for the resultant copolymer, a suitable vinyl monomer with a suitable fatty oil modified polyester resin. In general the polyester resins applicable are those having a fatty oil content of at least 50 per cent by weight, and containing a calculated average of at least about one and not more than three dibasic adduct residues or groups per polyester molecule.

In the absence of a suitable solvent, copolymerization of the vinyl monomer and the polyester proceeds rapidly at temperatures of the order of 100° to 150° C. to yield within 10 to 30 minutes' reaction time an infusible gel contaminated with appreciable amounts of unreacted or unpolymerized vinyl monomer. But in the presence of a solvent, the copolymerization reaction changes in character from a practically instantaneous gelation reaction to one requiring from about 6 to 72 hours for substantially all the available vinyl monomer present in the reaction mass to copolymerize with the polyester, and which yields as a final product, a fusible, soluble resinous mass, in contradistinction to the insoluble gelled masses of the prior art. Despite such long reaction cycles, there is no danger of forming a gelled mass, provided that a sufficient concentration of solvent is present in the reaction system. The practical minimum solvent concentration is about 10 per cent by weight of the total reaction system in the instance of a polyester resin having one or slightly more adduct groups per average ester molecule. As the number of adduct groups increases towards the permissible maximum of three per average ester molecule, higher solvent concentrations are found necessary to avoid gelation, particularly in the latter stages of the copolymerization reaction in attempting to complete the copolymerization of small residual amounts of unreacted vinyl monomer. With polyester resins of a higher content of calculated adduct groups per molecule (2 to 3), solvent concentrations of the order of 50 per cent and upwards to about 90 per cent are generally required to prevent gelation.

Different solvents in the copolymerization reaction do not appreciably alter the reaction rate, or per cent conversion of vinyl monomer to copolymer, provided a sufficient catalyst concentration is maintained. There is, however, an appreciable variation in the viscosities of the copolymer reaction products made with different solvents, as measured on the solutions of the copolymers in the respective solvents present during the reaction.

In illustration thereof, copolymer reactions were made in various organic solvents representative of ethers, esters, ketones, aromatic hydrocarbons, terpenes, and the lower, water-soluble fatty acids. The conditions of the reaction were a refluxing temperature at atmospheric pressure of 140°–150° C. for a total of seven hours. The reaction mass in each case comprised equal parts of styrene monomer and a polyester made from soya oil, glycerol and the cyclopentadiene adduct of maleic anhydride, the polyester having a calculated average of 1.5 adduct groups per molecule. The reaction mass contained a 20 per cent by weight concentration of solvent in each instance, and cumene hydroperoxide was used as the catalyst, an 0.25 per cent quantity by weight as calculated on the reactants (polyester and vinyl monomer) being added at the start of the reaction, with additional 0.25 per cent quantities being added after each hour for a total of six additions, equivalent to 1.50 per cent total.

As shown in Table I, hereinafter, the percentage conversion of styrene monomer to copolymer solids was substantially the same within a few per cent for the various solvents. The viscosities, however, ranged from a low of 19 poises to a high of 175 poises, the viscosity measurements as well as actual solid contents being made on the reacted materials diluted with the solvent present during reaction to 72 per cent solids (theoretical) to yield a final non-volatile content of approximately 70%.

*Table I*

| Solvent | Per Cent Solids | Per Cent Styrene Copolymerized | Viscosity in poises |
|---|---|---|---|
| acetophenone | 69.1 | 92.0 | 135 |
| amyl acetate | 69.4 | 93.0 | 75 |
| n-butyl ether | 68.4 | 90.0 | 55 |
| chlorobenzene | 69.2 | 92.2 | 90 |
| cumene | 69.1 | 91.8 | 46 |
| cyclohexanone | 70.2 | 95.0 | 175 |
| diethylene glycol diethyl ether | 69.2 | 92.0 | 75 |
| dipentene | 68.9 | 91.0 | 33 |
| propionic acid [1] | 68.7 | 90.9 | 32 |
| xylene | 69.3 | 92.0 | 55 |
| xylene-carbon tetrachloride mixture (95:5) | 69.2 | 92.2 | 19 |

[1] The propionic acid run required 8 rather than 6 cumene hydroperoxide additions to bring the quantity of styrene copolymerized up to 90.9 per cent.

Aliphatic hydrocarbon solvents such as the commercial mineral spirits, benzine, naphtha and the like which consist largely of aliphatics, have limited utility because of their poorer solvency properties for many of the copolymers, particularly those prepared with vinyl monomers in amounts exceeding 40 per cent by weight of the reaction mass, although with reaction systems of 40 per cent or less of a vinyl monomer such as styrene, gel-free copolymers can be successfully prepared. However, when the aliphatic hydrocarbons are employed in admixture with aromatic hydrocarbons, copolymerization is feasible with larger amounts of most vinyl monomers.

Alcohols, such as cyclohexanol, and alcohols having other solvating groups, such as ethylene glycol monoethyl ether, are poor solvents for most of the copolymers of this invention, and hence are considered useful in the copolymerization reaction only as diluents along with more powerful solvents.

The saturated monohydric alcohol ester type solvents (amyl acetate, butyl propionate, dibutyl phthalate and the like) are surprisingly inert in the copolymer reaction when peroxide catalysts are present to accelerate the reaction. In the absence of catalyst, however, some ester exchange with the polyester can occur because of the much longer reaction time required at reflux temperatures.

The copolymerization reaction in the presence of solvent can be safely accelerated by the use of catalysts which are capable of yielding free radicals at the reaction temperature. The peroxide catalysts meet this requirement and particularly di-tertiary-butyl peroxide, cumene hydroperoxide and the like which have a reasonable duration (half-life) at reaction temperatures as high as 125°–150° C. In general, the peroxides have been found to reduce the reaction time for substantially complete copolymerization of all the original charged weight of vinyl monomer in a reaction mass to a time cycle of about 6 to 12 hours. On the other hand, ionic-type catalysts, for example, boron trifluoride and acid-activated fuller's earth are not satisfactory, yielding resinous products lacking in air drying properties. Catalysts other than the peroxide type which have been found to promote the reaction include diazoaminobenzene, tetraphenyl hydrazine, and azo-bis-isobutyro-nitrile; of these, the tetraphenyl hydrazine was the least efficient whereas the other two promoted a copolymerization rate substantially the same as many of the peroxides.

In addition to the peroxide catalysts hitherto specifically identified, other peroxide catalysts found to be effective in promoting the copolymerization reaction are benzoyl peroxide, p-chlorobenzoyl peroxide, t-butyl perbenzoate, t-butyl perphthalic acid, t-butyl hydroperoxide, bis (t-butyl peroxy) butane, methyl amyl ketone peroxide and dibenzal diperoxide.

The peroxides and other catalysts, yielding free radicals by thermal decomposition, even when employed in small amounts of the total charge of reactants cause a vigorous exothermic reaction of the reactants. For this and economic reasons, the catalysts are generally used in small quantities, being generally less than about 5 per cent of the charge weight of reactants. Furthermore, the total amount of catalyst is more effectively employed by adding it in increments as the reaction proceeds. In the absence of catalysts copolymers are formed of much higher viscosities and with a greater tendency to gel during the copolymerization reaction.

The vinyl monomers capable of copolymerizing with the polyesters having an average of from 1 to 3 calculated dibasic adduct groups per molecule to yield homogeneous, fusible copolymers were found to be restricted to those monomers represented by the general formula $$CH_2=CHR$$

wherein R is a negative group having an unsaturated carbon to carbon, carbon to oxygen, or carbon to nitrogen group in conjunction with the vinyl group. Groups having such unsaturation in conjugation with the vinyl group are aryl, ketonic, heterocyclic, nitrile, carbalkoxy, carboxy and amido.

Specific vinyl monomers having utility for the purposes of this invention and which illustrate "R" as aryl (or substituted aryl) include styrene, halogen substituted styrenes such as ortho chloro styrene, para-iodo styrene, fluoro styrene, dichlorostyrene; alkyl substituted styrenes such as para ethyl styrene and tertiary butyl styrene; ethoxy styrene and para phenoxy styrene illustrated ether substituted aryl groups; para-dimethyl amino styrene illustrates an amino substituted aryl group; vinyl biphenyl and vinyl naphthalene, illustrate aryl substituted aryl; ortho vinyl benzoic acid and ortho-vinyl phenyl acetic acid depict the carboxyl substituted aryl groups.

Vinyl monomers where "R" is ketonic are represented by ethyl vinyl ketone, propyl vinyl ketone and phenyl vinyl ketone. "R" as a heterocyclic group is typified by 2-vinyl pyridine, 2-vinyl quinoline, vinyl pyrrole, vinyl carbazole and vinyl thiophene.

"R" as nitrile is represented solely by acrylonitrile, and similarly "R" as carboxy or amido typify only acrylic acid and acrylamide respectively.

"R" as carbalkoxy include as useful specific vinyl monomers the alkyl acrylates such as methyl acrylate, butyl acrylate, octyl acrylate, lauryl acrylate and cyclohexyl acrylate, and aryl acrylates such as phenyl acrylate and aralkyl acrylates such as benzyl acrylate.

Other vinyl monomers in which the alpha hydrogen atom of the vinyl group is replaced by a radical such as an alkyl group, or which lack conjugated unsaturation in the R grouping, either did not copolymerize or at most only self-polymerized when heated in admixture with the adduct polyester resins. For instance, vinyl acetate, vinyl chloride and vinyl 2-ethylhexyl ether, neither copolymerized nor polymerized in the presence of the polyester and a peroxide catalyst. Methyl isopropenyl ketone and ethyl methacrylate after several hours, reaction yielded a two phase system of polyester and polymerized monomer. No polymerization or copolymerization effects were noted in refluxing for several hours a suitable adduct polyester resin with vinyl monomers in which the beta-hydrogen is substituted, for example indene and the alkyl maleates or fumarates. Alpha-acetoxystyrene and ethyl alpha-chloro-acrylate in which the alpha hydrogen of the vinyl group is replaced by a second activating group were also found unsuitable; the former yielding a very poor polymerization rate, and the latter a viscous product consisting of two insoluble phases.

The reactants found operable for the preparation of fatty oil modified adduct polyester resins capable of copolymerization with vinyl monomers without gelation are somewhat restricted with respect to the type of fatty oil and the dibasic adduct. Fatty oils or the fatty acids obtained therefrom by hydrolysis which have conjugated carbon to carbon double bonds in their structure such as tung oil, oiticica or their fatty acids, eleostearic, licanic, etc., are not per se suitable since they are difficult to esterify into adduct polyester resins without incurring gelation. Furthermore, the limited number of such compositions which can be made tend to form infusible and insoluble gelled masses when reacted with vinyl monomers. With this exception, there can be used satisfactorily practically any vegetable, fish or animal fatty drying, semi-drying or non-drying fatty oil or any synthetic fatty oil consisting essentially of polyhydric alcohol esters of the saturated or unsaturated non-conjugated fatty acids which are normally present as such or as glycerides in natural fatty oils. Specific natural fatty oils which can be satisfactorily used are perilla oil, linseed oil, walnut oil, safflower oil, poppyseed oil, soyabean oil, sunflower oil, corn oil, cottonseed oil, castor oil, coconut oil and fish oils such as menhaden or sardine. The pentaerythritol esters of linseed fatty acids or soyabean oil fatty acids, which are essentially non-conjugated fatty acids, exemplify the synthetic fatty oils found useful in the preparation of adduct polyester resins. If desired, the polyester resins can be made directly from the fatty acids of these oils in a manner analogous to the preparation of conventional oil-modified alkyd resins based on phthalic anhydride. Of the total fatty acid content employed in making the polyester, up to about 20 per cent by weight thereof may if desired consist of the conjugated type of acids present as glycerides in oils such as tung oil or dehydrated castor oil.

The dibasic adducts having particular utility in the preparation of the polyesters are the adducts obtained through the Diels-Alder reaction of cyclopentadiene or dicyclopentadiene, with an alpha-beta unsaturated dicarboxylic acid or anhydride, specifically maleic, chloromaleic, fumaric and acetylene dicarboxylic acid. Also found useful is delta-1,4-dihydrophthalic acid, the Diels-Alder adduct of butadiene with acetylene dicarboxylic acid.

Dibasic adducts of other acids or diolefins than the aforementioned yield polyesters which either do not copolymerize or yield gelled products when reacted with a vinyl monomer. Thus the oil modified polyester from the adduct of cyclopentadiene and citraconic anhydride gelled in 20 minutes when heated with an equal amount of styrene to 140° C., even though the reactants were diluted with a solvent, namely, xylene; and similarly with the adduct polyester of 1-carboxymethyl-3-6-endomethylene-delta-4-tetrahydrobenzoic acid (itaconic acid adduct of cyclopentadiene). With dibasic adducts made from diolefins such as butadiene, for example trans-delta-4-tetrahydrophthalic acid, their fatty oil modified polyesters in reaction with styrene yield no copolymers, and the styrene polymerizes alone.

The dibasic adducts, as is well known, may be formed in situ during the esterification reaction with the polyhydric alcohol and fatty acids by having present a suitable unsaturated dibasic acid and diolefine, the former not exceeding the stoichiometrical amount required to form the adduct, whereas the diolefine can be present in excess.

A portion of the dibasic acid content of the polyester adduct resins can consist of other dicarboxylic acids such as phthalic, adipic, succinic, and the like, the amount of such acids not exceeding that reducing the calculated average number of adduct groups per molecule of polyester to less than about one.

Any saturated aliphatic polyhydric alcohol having two or more hydroxyl groups and free from reactive groups interfering with esterification or subsequent polymerization can be employed in the preparation of the adduct polyesters. Specific polyhydric alcohols which can be used include diethylene glycol, triethylene glycol, propylene and dipropylene glycol and higher glycols for example 2-ethyl hexane diol; glycerol, trimethylol ethane, and trimethylol propane exemplify the trihydric alcohols; sorbitol, pentaerythritol and dipentaerythritol exemplify polyhydric alcohols of four or more hydroxyl groups.

The discovery that certain fatty oil modified adduct polyester resins were suitable for copolymerization with vinyl monomers to yield soluble copolymers resulted from an accidental selection of a polyester having a lower molecular weight than normal for commercial use in making oleoresinous varnishes. Upon investigation of this resin and similar ones, the factors determining suitability for copolymerization were derived from a consideration of reactant proportions and the extent or degree of esterification as measured by the initial acid number of the reaction mass and the acid number of the final reaction product. It was then discovered that the useful range of polyester resins were those obtained by esterifying a polyhydric alcohol with such proportions of suitable fatty acids and a suitable dibasic adduct as previously described, whereby with sufficient reaction, a mixture of fusible, soluble polyesters were obtained having a calculated average per polyester molecule of between one and three adduct residues or groups (diacyl). The formula employed for calculating the average number of such adduct groups per ester molecule is $$G = \frac{X}{N - 2(X+P)\left(1 - \frac{AN}{AN_0}\right)}$$

where X is the number of mols of a suitable dibasic adduct as heretofore described, G is the average number of such adduct groups per ester molecule, P is the number of mols other dicarboxylic acid (phthalic, delta-4-tetradrophtalic acid, etc.) if such be present, N is the total number of mols in the reaction mixture consisting of fatty oil, polyhydric alcohol and dibasic acid or acids, AN is the acid value of the ester resin, and $AN_0$ is the calculated acid value prior to esterification.

When the adduct polyester is made directly from the higher fatty acids instead of fatty oil, the total fatty oil mols are calculated by converting the fatty acids to the complete esters of the particular polyhydric alcohol or alcohols present in the reaction mixture, and the amount of polyhydric alcohol required for this purpose is subtracted from the total amount of polyhydric alcohol.

The formula for calculating G is based on the consideration that a fatty oil modified adduct polyester resin is fundamentally derived from fatty oil, polyhydric alcohol, and one or more dibasic acids. With N being the sum total number of molecules of these reactants and $2(X+P)$ designating the total number of carboxyl groups available for esterification from the dibasic acids, then the total number of ester groups which can be formed at any stage by intermolecular esterification is between 0 and $2(X+P)$. Since the degree of esterification at any time during the course of the reaction is the ratio of ester groups formed to the total number of available dibasic acid carboxyl groups at the start of the reaction, this can then be expressed mathematically as $$1 - \frac{AN}{AN_0}$$

where AN is the acid number value[1] at any given reaction stage and $AN_0$ is the calculated acid number value of the total dibasic acids in the reaction mixture prior to initiating esterification. The number of ester groups formed at any time during the reaction is then $$2(X+P)\left(1 - \frac{AN}{AN_0}\right)$$

where esterification proceeds only intermolecularly, since each ester group (as formed from a molecule each of an alcohol and an acid) results in a loss of one in the total number of molecules in the system. Therefore, the total number of molecules at any time can be expressed by $$N - 2(X+P)\left(1 - \frac{AN}{AN_0}\right)$$

and by definition then the number of adduct residues or groups per average molecule $$G = \frac{X}{N - 2(X+P)\left(1 - \frac{AN}{AN_0}\right)}$$

As an illustration in the use of the formula, a fatty oil modified adduct polyester resin was prepared from the following composition 1.00 mol soya oil
1.10 mols glycerol
1.50 mols cyclopentadiene adduct of maleic anhydride This composition had a 10 per cent excess of glycerol and the value of $AN_0$ was 140. Setting up the respective values in the formula with X as 1.5; N as 3.60; and P as 0, yields $$G = \frac{1.50}{0.60 + 3\frac{AN}{AN_0}}$$

Upon reacting the mixture to an acid number value of 17.5 G had a value of 1.54; with further esterification to the lower acid number value of 16, G calculates to 1.59.

In further explanation of the formula, one can assume that esterification of a polyhydric alcohol and a dibasic acid under conditions avoiding gelled products proceeds only inter-molecularly, an ester molecule with one ester group being formed by the esterification of one molecule of polyhydric alcohol and one molecule of dibasic acid, thus resulting in a loss of one in the total number of molecules in the reaction system. This ester molecule contains one or more unesterified hydroxyl groups, depending on the original hydroxyl content of the alcohol, and a dibasic acid residue or group having a free or unreacted carboxyl group. Accordingly, a hydroxyl group of such ester molecule can react by forming an ester group with an unesterified carboxyl group in a second similar ester molecule to form from these two ester molecules a single larger ester molecule that now contains two dibasic residues. In turn, this larger ester molecule that still has one unreacted dibasic acid carboxyl group can react with another ester molecule containing one or more dibasic residues and at least one unesterified hydroxyl group to form a much larger ester molecule containing a total of 3,4 or more dibasic acid residues or groups (diacyl).

Since each adduct residue of a suitable dibasic adduct, such as the cyclopentadiene adducts, contains one olefinic carbon to carbon linkage, and such linkage is a potential reactive point with a vinyl monomer, the larger the average number (G) of such residues per molecule, the greater likelihood there is for cross-

---

[1] The acid number value is the number of milligrams alcoholic KOH required to neutralize a gram sample of the material with phenolphthalein as indicator. The end point with phenolphthalein is the typical pink color developed at a pH of about 9 to 10. The pink color is fugitive with these polyesters but nevertheless is of sufficient duration to be recognized.

linking to occur with resultant insoluble products.

The amount of adduct residues of the X type dibasic adducts present in the average polyester molecule can be controlled, however, by several individual or joint means. For example in a reaction system of polyhydric alcohol, fatty acid and the X type dibasic adduct, by having a sufficient amount of the monofunctional fatty acids to esterify a major amount of the polyhydric alcohol hydroxyl groups, the possibility of the difunctional dicarboxylic adduct for chaining individual ester molecules is considerably reduced. Alternatively the same result is obtained by starting with polyhydric alcohols partly esterified with oil fatty acids. For example, in a system of two mols soya fatty acid diglyceride and one mol dibasic adduct, only two types of ester molecules can be formed (assuming no ester interexchange), each type having but one adduct residue or group. One type of ester molecule is a single glyceryl residue with two fatty acid ester groups, and one adduct ester group having an unreacted carboxyl group. In the other type of ester molecule, its structure consists of two glyceryl residues, each containing two fatty acid ester groups, the two glyceryl residues being chained together by the two ester groups of one adduct residue, as depicted below:

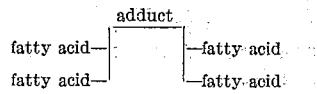

An adduct polyester resin of higher average content of adduct groups per molecule can be obtained by first effecting ester interexchange between one mol linseed oil and 2 mols diethylene glycol, and then reacting the resultant partial polyhydric alcohol esters with 2 mols of cyclopentadiene-maleic adduct. The polyester if it could have been run to zero acid value would yield an average composition having two adduct residues per ester molecule as depicted below:

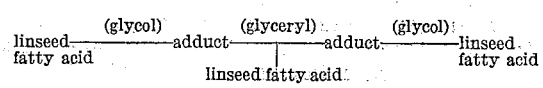

A portion of the reaction mass was removed, however, when an acid value of 17.7 was attained, which by calculation had an average of 1.37 adduct residues. The remainder was further esterified to an acid value of 9.06, the product then having a calculated average adduct residue content per molecule of 1.63. Reacting the first portion with an equal weight of styrene in 67 per cent concentration in xylene for 60 hours at 140° C. (in the absence of catalyst) gave 87 per cent conversion of the styrene with no indication of gelation. The second fraction of higher adduct content per molecule reacted under the same conditions yielded a gel in less than 12 hours reaction, well under half of the styrene having been copolymerized prior to gelation, the presence of more solvent or a peroxide catalyst would have prevented gelation.

Other means in addition to fatty acid content for terminating ester chaining and thereby restricting the number of X type adduct groups per molecule involve limited excess amounts over stoichiometrical quantities of either the dibasic adduct or the polyhydric alcohol, but not more than about a 25 per cent excess; or by replacing part of the X type dibasic adduct with other aliphatic or aromatic dicarboxylic acids.

The invention is further illustrated in the following examples, in which all parts are by weight unless otherwise stated.

*Example 1*

A soya oil modified adduct polyester resin was made from the following:

2640.0 parts soya oil (3.00 mols)
310.0 parts 98% glycerol (3.30 mols)
0.95 parts litharge (PbO)
290.0 parts xylene
297.0 parts dicyclopentadiene (4.50 equivalents)
442.0 parts maleic anhydride (4.50 mols)

The soya oil and the glycerol were first subjected to an ester exchange reaction at 215°–220° C. under the catalytic effect of the lead oxide. The other raw materials were then added in the order listed, the addition of the xylene reducing the temperature to about 150° C. The dicyclopentadiene and maleic anhydride formed the adduct cis-3,6-endomethylene delta-4-tetrahydrophthalic anhydride in situ, while the reaction mass was gradually heated during the course of an hour to a temperature of 200° C. under conditions of atmospheric reflux. The batch was held at reflux (200°–207° C.) for esterification to a desired end point as measured by acid number determinations. Water formed during the process was distilled azeotropically with the xylene and separated in a suitable trap before returning the solvent to the batch. Fractions were taken at the following acid values for copolymerization with styrene:

| Fraction | Acid No. (Solids) | Calculated adduct groups per mol. | Viscosity (as is) 25°C. |
|---|---|---|---|
| | | | *centistokes* |
| A | 18.7 | 1.50 | 435 |
| B | 15.4 | 1.62 | 598 |
| C | 12.8 | 1.72 | 800 |
| D | 10.3 | 1.83 | 1,270 |
| E | 9.7 | 1.87 | 1,750 |

*Example 2*

A 50% styrene copolymer of fraction B of Example 1.

216.0 parts fraction B from above (200 parts resin solids)
200.0 parts styrene
117.0 parts xylene
1.6 parts di-tertiary-butyl peroxide The intermediate, styrene and xylene were heated to 135° C. and the peroxide added in four portions at 2 hour intervals. The course of the reaction was followed by non-volatile determinations; after 10 hours a non-volatile content of 73.3% was reached or 95% of the styrene was polymerized. The resin solution had the following other properties:

Viscosity, as is (25° C.) __ Above "Z–6" (Gardner scale)
Viscosity at 50% non-volatiles in xylene ____ "R" (Gardner scale)
Color (as is) _____ 3 (Gardner scale)

*Example 3*

White enamel from Example 2.

134 parts Example 2
100 parts titanium dioxide (rutile)

An initial dispersion of the above was made in a pony mixer and then the enamel was finely ground on a 3-roll paint mill, 3 passes being made. Cobalt drier in the amounts of 0.01 and 0.02% as metal on the resin solids were added to samples of the enamel thinned somewhat with xylene. Films deposited on glass and steel surfaces after baking at 135° C. for one hour were well cured, tough and adherent.

*Example 4*

A 50% styrene copolymer of fraction C of Example 1.

270.0 parts fraction C
250.0 parts styrene
147.0 parts xylene
2.0 parts di-tertiary-butyl peroxide The same technique of Example 2 was used with the result that gelation occurred after about 8 hours of reaction and 90% conversion of styrene monomer. It was concluded that an average of 1.7 adduct groups in this intermediate was too high to copolymerize all the styrene at a 75% reaction concentration in solvent, but would be feasible with lower concentration and higher solvent content.

*Example 5*

Copolymer made with cumene hydroperoxide as catalyst.

324.0 parts soya oil modified adduct polyester resin (fraction B of Example 1)
300.0 parts styrene
126.0 parts xylene
9.0 parts cumene hydroperoxide
83.0 parts xylene for thinning The polyester, styrene and first portion of xylene were held at atmospheric reflux (140–155° C.) and cumene hydroperoxide added in six portions of 1.5 parts each, one hour apart. After a total of seven hours' heating the batch was thinned with the second portion of xylene and cooled. The final resin solution had the following properties:

Acid value _____ 5.1
Color _____ 4 (Gardner scale)
Non-volatile _____ 71.8%
Specific gravity _____ 0.985 25°/25° C.
Viscosity (25° C.) ___ "Z-6" (as is, Gardner scale)
                       "T" at 50% non-volatile (Gardner scale)

*Example 6*

A 40% styrene copolymer was made with a soya oil modified adduct polyester reacted as per Example 1 to an acid number of 17.3 by reacting the following:

1173.0 parts 92% non-volatile polyester solution
420.0 parts styrene
357.0 parts xylene
27.0 parts cumene hydroperoxide
250.0 parts xylene The reaction technic of Example 5 was followed to yield a resin solution having the following properties:

Acid value _____ 6.9
Color _____ 4 to 5 (Gardner scale)
Non-volatile _____ 69.9%
Specific gravity _____ 0.978 25°/25° C.
Viscosity (25° C.) ____ "Z" (Gardner scale)

*Example 7*

A linseed oil modified polyester resin was made from:

2640.0 parts linseed oil (3.00 mols)
310.0 parts 98% glycerol (3.30 mols)
0.95 part litharge (PbO)
306.0 parts xylene
297.0 parts dicyclopentadiene (4.50 equivalents)
442.0 parts maleic anhydride (4.50 mols)

The esterification technic of Example 1 was followed and a 92% non-volatile resin solution obtained having an acid value of 14.3 or 15.5 on the non-volatile. This corresponds to a calculated average of 1.61 adduct groups per molecule.

*Example 8*

A 50% styrene copolymer of Example 7.

542.5 parts Example 7 polyester solution
500.0 parts styrene
337.5 parts xylene
15.0 parts cumene hydroperoxide The polyester, styrene and xylene were held at reflux (137°–147° C.) and the cumene hydroperoxide added in six portions of 2.5 parts each. After 7 hours a non-volatile content of 68.6% was reached. This preparation differed in technic from that of Example 5 only in that the concentration of reactants was reduced from 80% to 72%, a change made necessary by the slightly greater reactivity of the linseed modified polyester resin.

*Example 9*

Adduct polyester resin made directly from fatty acids of soya oil.

1275.0 parts soya fat acids (4.55 mols)
296.0 parts 98% glycerol (3.15 mols)
145.0 parts xylene
148.5 parts diclopentadiene (2.25 equivalents)
220.5 parts maleic anhydride (2.25 mols)

The fatty acids and glycerol were first esterified in the presence of the xylene, water being removed azeotropically. From the specific gravity of the aqueous distillate it was estimated that 14 parts of glycerol had been lost from the batch; this amount was replaced when the dicyclopentadiene and maleic anhydride were added. Esterification was continued until an acid value of 15.6 (solids basis) was reached; the calculated number of adduct groups was 1.61.

*Example 10*

A 50% styrene copolymer of the polyester from Example 9.

324.0 parts Example 9 polyester solution
300.0 parts styrene
126.0 parts xylene
9.0 parts cumene hydroperoxide
83.0 parts xylene The above were reacted by the technic described in Example 5, yielding a copolymer resin having the following properties:

Acid value _____ 5.1
Color _____ 4 (Gardner scale)
Non-volatile _____ 69.5%
Viscosity (25° C.) ____ Z-5+ (Gardner scale)

When ground into a white enamel it was indistinguishable in film performance from the copolymer resin of Example 5 made from the fatty oil.

Example 11

Adduct polyester resin containing 68% soya oil and 10% excess glycerol.

931.0 parts soya oil (1.06 mols)
137.5 parts 98% glycerol (1.465 mols)
0.50 part litharge (PbO)
109.0 parts xylene
132.0 parts dicyclopentadiene (2.00 equivalents)
196.0 parts maleic anhydride (2.00 mols)

The above were reacted in the manner described in Example 1. The resultant 92% polyester solution had the following properties:

Acid value_____ 16.4 or 17.7 on solids
Calculated average adduct
 groups per molecule____ 2.09
Viscosity (25° C.)_____ 2060 centistokes

Example 12

A 50% styrene copolymer from Example 11.

216.0 parts Example 11 polyester solution
200.0 parts styrene
354.0 parts mineral spirits
9.6 parts cumene hydroperoxide The polyester, styrene and mineral spirits were held at atmospheric reflux (150°–160° C.) and the cumene hydroperoxide added in six equal portions at hourly intervals. After a total of 7 hours' heating it was estimated that 90% of the styrene had been converted.

Properties found included:

Acid value_____ 4.7
Non-volatile_____ 49.4%
Color_____ 3 (Gardner scale)
Viscosity (25° C.)_ "U" to "V" (Gardner scale)

Example 13

White enamel from styrene copolymer of Example 12.

400 parts Example 12
200 parts titanium dioxide (rutile)

The above were ground in the same manner as described in Example 3. Cobalt drier in the amount of 0.05% as metal based on the resin solids was added to a sample; a sample of Example 3 was treated in the same way to obtain a direct comparison between the two enamels. Films were then applied to steel panels by means of a knife blade and placed in a constant temperature room to dry (25° C., 50% relative humidity). After one day of air-dry the film from Example 13 was much tougher and more adherent than that of Example 3. After one week of air-dry these differences were not so great; both films being much like the same materials which had been baked for 1 hour at 135° C. to cure.

Example 14

A soya oil modified polyester resin containing 68% oil and 25% excess glycerol was made from the following:

931.0 parts soya oil (1.06 mols)
155.0 parts 98% glycerol (1.65 mols)
0.50 part litharge (PbO)
111.0 parts xylene
132.0 parts dicyclopentadiene (2.00 equivalents)
196.0 parts maleic anhydride (2.00 mols)

The esterification technic of Example 1 was again followed with the following results (92% non-volatile solution):

Acid value_____ 18.3 or 19.75 on solids
Calculated average adduct
 groups per molecule____ 1.68
Viscosity (25° C.)_____ 720 centistokes

Example 15

A 50% styrene copolymer from the polyester of Example 14 was made by reacting the following:

324.0 parts Example 14 polyester solution
300.0 parts styrene
126.0 parts xylene
9.0 parts cumene hydroperoxide
83.0 parts xylene (for thinning)

The copolymerization technic of Example 5 was followed to make a copolymer resin having the following properties:

Color_____ 4 (Gardner scale)
Non-volatile_____ 68.5%
Viscosity (25° C.)_____ Z–2 (Gardner scale)

Example 16

An adduct polyester modified with phthalic acid and containing 68% oil and 10% excess glycerol was made from the following:

931.0 parts soya oil (1.06 mols)
137.5 parts 98% glycerol (1.465 mols)
0.50 part litharge (PbO)
108.0 parts xylene
89.0 parts phthalic anhydride (0.60 mols)
92.0 parts dicyclopentadiene (1.40 equivalents)
137.0 parts maleic anhydride (1.40 mols)

The esterification technic was again similar to that of Example 1, yielding a resin solution with the following properties found (92% non-volatile solution):

Acid value_____ 15.25 or 16.5 on solids
Average adduct groups per
 molecule_____ 1.51
Viscosity (25° C.)_____ 1430 centistokes

Example 17

A 50% styrene copolymer from Example 16.

324.0 parts Example 16 polyester solution
300.0 parts styrene
209.0 parts xylene
9.0 parts cumene hydroperoxide The cumene hydroperoxide was added in 6 portions of 1.5 parts each to the other raw materials which were heated to reflux at atmospheric pressure. The final copolymer resin solution had these properties:

Acid value_____ 8.2 on resin
Non-volatile_____ 71.0%
Color_____ 2 (Gardner scale)
Viscosity (25° C.)_____ Z6–Z7 (Gardner scale)

Example 18

A soya monoglyceride modified adduct polyester resin was made with 100% excess dicyclopentadiene by reacting the following:

880.0 parts soya oil (1.00 mol)
206.5 parts 98% glycerol (2.20 mols)
0.52 part litharge (PbO)
138.0 parts xylene
396.0 parts dicyclopentadiene (6.00 equivalents)
294.0 parts maleic anhydride (3.00 mols)

After an ester interchange reaction between the oil and glycerol, the other raw materials were added in the order given and esterification carried out azeotropically to an acid value of 17.25 or 18.6 on the solids. That part of the cyclopentadiene was volatilized was evident from a weight loss of 48 g. greater than was anticipated. Correcting for this loss and assuming no higher adducts than two cyclopentadienes per maleic, the average number of single adduct groups per molecule calculates to 0.95.

*Example 19*

A 50% styrene copolymer of polyester of Example 18 was made from the following:

324.0 parts Example 18
300.0 parts styrene
126.0 parts xylene
9.0 parts cumene hydroperoxide
83.0 parts xylene
159.0 parts xylene for thinning Copolymerization was started at 80% concentration of the reactants in xylene, catalyst additions of 1.5 parts being made at hourly intervals after gaining atmospheric reflux temperature. After 3½ hours the second portion of xylene was added to thin out the very viscous product somewhat. After the copolymerization was complete the last portion of solvent was added.

Non-volatile _____ 59.6%
Viscosity (25° C.) _____ "Z-5"+(Gardner scale)
Viscosity (25° C.) _____ "Z" to "Z-1" reduced to 50% non-volatile

*Example 20*

An adduct polyester from coconut fatty acids was made by charging into a 5 liter 3 neck flask, equipped with agitation, water trap, condenser and thermometer the following:

|  | Mols | Weights, grams |
|---|---|---|
| Double dist. coconut fatty acids [1] | 9 | 1989.0 |
| 98% glycerol | 6.3 | 592.0 |
| Cis-3,6-endomethylene delta-4-tetrahydrophthelic anhydride | 4.5 | 737.5 |
| Xylol | | 300.0 |

[1] Specifications of fatty acids:
Acid value _____ 254
Iodine value (Wijs) _____ 12.0
Titer _____ 28.0° C.
Color _____ Water white The mixture was heated to reflux temperatures, while separating water of esterification and returning the hydrocarbon to the reaction vessel. A temperature of 200° ±5° C. was maintained until an acid number of 17.0 was reached. At this point the polyester had a calculated adduct group content of 1.59 per mol. The polyester solution at this stage had a non-volatile content of 90.5%. The over all esterification time consumed 14 hours.

*Example 21*

Copolymerization of Example 20 polyester at the ratio of 50% polyester to 50% styrene.

There was charged in a 1 liter 3 neck flask equipped with thermometer, agitator and condenser the following:

166.0 grams polyester (Example 20)
150.0 grams styrene
184.0 grams xylene

After agitating this mixture, there was added 1.07 c. c. cumene hydroperoxide and the mixture then heated to reflux at 136° C. under atmospheric pressure. After each hour of refluxing an additional 1.07 c. c. quantity of peroxide was added for a total of 4 increments. At this time a reflux temperature of 140° C. was observed. The non-volatiles at the end of this time had achieved the theoretical. The batch was cooled down and had the following properties:

Acid number on the solids _____ 8.4
Viscosity (Gardner-Holdt) _____ X
Color (Gardner) _____ 1

The final copolymer resin solids were a semi-rubbery composition, water white in color, and possessing pressure tack characteristics. The composition was incompatible with nitrocellulose, and partially compatible with alcohol soluble urea- or melamine-formaldehyde resinous condensation products. The compatibility with rosin modified oil-soluble phenol-formaldehyde resins was good.

*Example 22*

An adduct polyester modified with castor oil was prepared in the following manner. The reaction equipment comprised a 5 liter 3 neck flask, agitator, water separator, condenser, thermometer and $CO_2$ inlet. The flask was charged with 2.4 mols (2222.4 grams) castor oil (U. S. P. Grade) and blown with carbon dioxide while agitated and heated to 180° C. There was then added 3.6 grams litharge paste ground in 7.2 grams of castor oil and the mixture heated to 200° C., and held for 10 minutes. There was then added 248 grams of 98% glycerol (2.64 mols) and the ester interexchange reaction continued at 200° C. for 1 hour. The mixture was then cooled to 150° C. and the following added:

245.6 grams toluene
240.0 grams dicyclopentadiene (3.64 mols calculated as cyclopentadiene)
352.8 grams maleic anhydride (3.6 mols)

The mixture was reheated to 200° C. and held at this reflux temperature while separating water of esterification over a period of 9 hours to an acid number of 14.5, equivalent to 1.63 calculated adduct groups per molecule. The polyester was then cooled and discharged.

*Example 23*

Copolymer containing 40% styrene copolymer with the castor oil polyester of Example 22.

To a 1 liter flask equipped with agitator, reflux condenser and thermometer, there was charged:

200.0 grams polyester (Example 22)
127.2 grams styrene
126.8 grams toluene
4.0 c. c. ditertiary butyl peroxide The mixture was heated to reflux at 121°–123° C. and held 4½ hours. At this point the solid content was 67.3% against a theoretical of 70.0%. The solids were a light colored resin which was incompatible with nitrocellulose and back hydrolyzed vinyl chloride-vinyl acetate copolymers such as Vinylite VAGH. The resin showed limited compatibility with alcohol soluble urea and melamine resins but was readily compatible with rosin-glycerol esters. The resin was incompatible with ethyl cellulose.

*Example 24*

Example of a castor oil modified adduct resin made without added polyhydric alcohol, esterification being with the hydroxyl groups present in the castor oil.

To a 5 liter flask equipped as before there were charged:

2585.0 grams castor oil (2.79 mols)
206.0 grams maleic anhydride (2.10 mols)
143.0 grams dicyclopentadiene (2.17 mols as cyclopentadiene)
140.0 grams toluene The mixture while agitated and blown with $CO_2$ was heated to atmospheric reflux temperature. Water of esterification was removed while refluxing continued at a temperature of 200° C. ∓5° C. After 14 hours, the acid number of the solution was 11.4. The polyester was at 97.2% non-volatiles. The calculated number of adduct groups was 1.62.

Example 25

Preparation of styrene copolymer from the polyester of Example 24.

To a 1 liter flask there were added:

216.0 grams polyester (Example 24)
90.0 grams styrene
294.0 grams xylene
3.46 c. c. ditertiary butyl peroxide The mixture was heated to reflux (136° C.), at atmospheric pressure and held for 3 hours. The non-volatiles in the reaction systems at the end of this time were 47.5% indicating substantially complete copolymerization.

The copolymer resin solution was found to be incompatible with nitrocellulose; it showed limited compatibility with alcohol soluble urea- and melamine-formaldehyde resins.

On removing the solvent by casting films from the above styrene copolymer, it was found that the resin was a semi-rubbery copolymer which was thermoplastic in nature.

Example 26

A polyester containing a high ratio of aromatic dibasic acid to dibasic adduct was made by heating together:

1320.00 grams soya oil (1.500 mols)
228.00 grams technical pentaerythritol (1.575 mols)
0.54 gram litharge to effect ester interexchange between the soya oil and the pentaerythritol. There were then added:

156.0 grams xylene
370.0 grams phthalic anhydride (2.500 mols)
34.0 grams dicyclopentadiene (0.515 equivalents)
49.0 grams maleic anhydride (0.500 mol)

and reacted by heating under atmospheric reflux conditions.

Two fractions were taken, fraction A when the reaction mass attained an acid number=11.0 (on solids) and 1.125 calculated adduct groups per molecule and fraction B when the acid number was further reduced to 7.4 with 1.57 calculated adduct groups per molecule.

Example 27

Copolymerization of fraction A from Example 26 with styrene.

The following was reacted by heating to reflux temperature:

324.0 grams fraction A (300 pts. resin solids)
300.0 grams styrene
209.0 grams xylene
9.0 grams cumene hydroperoxide The peroxide was added in 6 equal parts; after a total of 7 hours of refluxing a copolymer solution of 69.0% non-volatiles and 92% conversion of styrene was obtained. The copolymer solution was very viscous and somewhat hazy, indicating some incompatibility, probably due to the presence of some ester molecules containing only phthalate ester groupings. The solution however, was reasonably clear in thin sections or even in heavy films.

Example 28

Styrene copolymerization of fraction B from Example 26.

The following charge was reacted in the same manner described in Example 26:

324.0 grams Example 26B
300.0 grams styrene
209.0 grams xylene
9.0 grams cumene hydroperoxide Gelation occurred, however, when only ⅓ of the total amount of peroxide was introduced or at about 50% conversion of the styrene to copolymer. Gelation could have been prevented if the solvent concentration had been increased to about 50 per cent.

Example 29

Adduct polyester made with pentaerythritol as the polyhydric alcohol.

A polyester was made according to the same general procedure described in the previous examples from the following charge:

1408.0 grams soya oil (1.60 mols)
127.0 grams technical pentaerythritol (0.88 mol)
0.54 grams litharge
142.0 grams xylene
109.0 grams dicyclopentadiene (1.648 equivalents)
157.0 grams maleic anhydride (1.60 mols)

A fraction "A" was removed from the charge when the above had reacted to an acid number value of 11.7 with a corresponding adduct group content of 1.29. This fraction had a viscosity of 502 centistokes. A second fraction B was obtained by reacting further to an acid number value of 7.5 and a viscosity of 1080 centistokes. The calculated content of adduct groups per molecule for fraction B was 1.45.

Example 30

Copolymerization of styrene with fraction "A" of Example 29.

The following charge was reacted at refluxing temperature and at atmospheric pressure:

324.0 grams fraction "A" (Example 29)
300.0 grams styrene
126.0 grams xylene
9.0 grams cumene hydroperoxide The charge copolymerized satisfactorily to 69.3% non-volatiles, a viscosity of Z5 (Gardner scale) and 93% conversion of styrene to copolymer. The copolymer product compared well with the product of Example 2 in coating performances.

Example 31

Copolymerization of styrene with fraction "B" of Example 29.

The following charge was reacted at refluxing temperature:

324.0 grams fraction B (Example 29)
300.0 grams styrene
209.0 grams xylene
9.0 grams cumene hydroperoxide

Example 32

A polyester resin was made from the following charge:

1408.00 grams soya oil (1.60 mols)
159.00 grams technical pentaerythritol (1.10 mols)
0.55 gram litharge
149.00 grams xylene
89.00 phthalic anhydride (0.60 mol)
95.00 grams dicyclopentadiene (1.443 equivalents)
138.00 grams maleic anhydride (1.40 mols)

The charge was reacted in the usual manner, yielding a polyester having an acid number value 13.1 (on solids), an average adduct residue content of 1.23 and a viscosity of 872 centistokes at 25° C.

Example 33

A copolymer was made by heating to reflux temperature at atmospheric pressure the following charge:

324.0 grams polyester resin of Example 32
300.0 grams styrene
126.0 grams xylene
9.0 grams cumene hydroperoxide The copolymerization proceeded without incident and yielded a copolymer solution of 67.5% non-volatile content or 85% conversion of the styrene. The viscosity of the copolymer solution was Z4 (Gardner scale).

Example 34

A polyester resin of more than 2 adduct groups per molecule was made from the following charge:

4733.0 grams linseed oil (5.38 mols)
3410.0 grams cyclopentadiene adduct of maleic anhydride (20.8 mols)
7.0 grams litharge
1210.0 grams diethylene glycol (11.42 mols)
640.0 grams technical pentaerythritol (4.70 mols)

The linseed oil and glycol were ester interchanged by heating with the litharge with the catalyst. The adduct and pentaerythritol were then added and the charge run to an acid number value of 54 corresponding to an average adduct residue content of 2.14 groups per mol.

Example 35

Styrene copolymer of polyester from Example 34.

The following charge was heated to atmspheric reflux temperatures (135° C.):

100.0 grams polyester Example 34
232.5 grams styrene
332.5 grams xylene

Refluxing was continued for 80 hours in the absence of catalyst until the charge had a non-volatile content of 49.2%, and 97.5% conversion of styrene. The viscosity of the solution was Z to Z1 (Gardner scale). The solution did not keep very well, gelation occurring on standing several weeks at room temperature.

Example 36

Polyester resin having an average of more than 3 adduct residues per molecule.

A polyester resin was made from the following charge:

5292.0 grams soya oil (6.02 mols)
1165.0 grams glycerol (12.65 mols)
2.0 grams litharge
1221.0 grams dicyclopentadiene (18.5 equivalents)
1720.0 grams maleic anhydride (17.55 mols)

The oil and glycerol were interexchanged by heating with litharge. Then dicyclopentadiene plus maleic anhydride were added. The charge was run to an acid number value of 25 on the solids, for which the calculated average adduct residue content was 3.38 per molecule.

Example 37

Copolymerization with styrene of ester resin made in Example 36 as attempted by heating the following charge:

250.0 grams ester resin Example 36
250.0 grams styrene
167.0 grams xylene
1.0 grams ditertiary butyl peroxide The reaction was conducted under conditions similar to that of Example 2. Gelation occurred, however, within 14 minutes of gaining 135° C. with much of the styrene not copolymerizing with the ester.

Styrene copolymers containing as little as 25% styrene were found to have reasonable air-drying speeds although the resulting films are not as tough as those containing 40-60% styrene. It should be noted that many of the polyesters employed in the present invention are of such relatively low molecular weights and so highly modified with oil, that without modification by copolymerization they exhibit practically no drying activity. Copolymers containing as much as 75% styrene have also been made but they are of much more limited usefulness as respects coating applications because of their brittleness. The most useful range of styrene content as copolymer is between 40-60% for superior air-drying and baking coating vehicles, characterized by air-drying to a tack-free state in 10 to 15 minutes.

Example 38

Polyester resin having 10% excess of adduct COOH-groups.

A polyester resin was obtained from the following charge:

880.0 grams soya oil (1.00 mol)
93.8 grams 98% glycerol (1.00 mol)
0.48 gram litharge
97.0 grams xylene
109.0 grams dicyclopentadiene (1.65 equivalents as cyclopentadiene)
162.0 grams maleic anhydride (1.65 mol)

The charge was reacted in the normal procedure, yielding a viscous polyester resin having an acid number value of 22 and a calculated adduct content of 2.0 groups per molecule.

Example 39

A styrene copolymer of the polyester resin from Example 38 was prepared by refluxing at atmospheric pressure the following charge:

324.0 grams polyester resin of Example 38
300.0 grams styrene
126.0 grams xylene
9.0 grams cumene hydroperoxide The charge was reacted for about 7 hours with the usual 6 hourly catalyst additions, yielding a copolymer solution of 69.0% non-volatile content after the dilution with xylene to 72% theoretical solids, equivalent to 92% styrene conversion to copolymer. The diluted solution had a viscosity of Z6+ (Gardner scale).

*Example 40*

Copolymer of an adduct polyester resin with methyl vinyl ketone.

A soya oil modified cyclopentadiene adduct polyester resin substantially the same as Example 1B, with the following properties:

Acid value_____ 18.3 on non-volatile content
Viscosity_____ 490 centistokes
Non-volatile_____ 94.4% (calculated)
Calculated average adduct groups per mol_____ 1.51 was copolymerized with an equal weight of methyl vinyl ketone in 80 per cent concentration in xylene and with 2.0% benzoyl peroxide as catalyst. The mixture was refluxed at 80° C. yielding a clear viscous copolymer up until 80% of the methyl vinyl ketone had copolymerized. Continuing the reaction in an attempt to polymerize the remaining 20% of the ketone resulted in a gelled mass.

*Example 41*

Copolymer of an adduct polyester with 2-vinyl pyridine.

Equal quantities of 2-vinyl pyridine and the same polyester used in Example 42 were reacted in 80% concentration in xylene together with 2.0% benzoyl peroxide as catalyst. The mixture was reacted by refluxing at 130°–134° C. After 7 hours refluxing, 75% of the 2-vinyl pyridine was found to have copolymerized; the copolymer was a dark viscous resin.

Acrylonitrile polymers are generally less soluble in organic solvents than other vinyl polymers. Hence in reacting acrylonitrile with an oil-modified adduct resin, a more powerful solvent is required and in a larger quantity than with the more soluble styrene copolymers. Xylene or other aromatic hydrocarbon is not a satisfactory solvent for this monomer, but dimethylformamide is suitable as shown in the following example.

*Example 42*

Acrylonitrile-adduct polyester copolymer.

Equal parts by weight of acrylonitrile and the polyester resin employed in Example 42 were dissolved in dimethylformamide to form a solution of 80% reactant concentration. Ditertiary butyl peroxide was employed as catalyst. The solution was heated to a refluxing temperature of 90° C. Complete homogeneity existed throughout the refluxing reaction. After about 4 hours when about 40% of the monomer had copolymerized, gelation occurred. Although gelation occurred, that true copolymerization resulted was shown by the fact that complete homogeneity existed throughout the reaction. If only self-polymerization had occurred, gelation would have not been possible since polyacrylonitrile is a thermoplastic resin, soluble in dimethylformamide. These results are in contrast with an inconclusive experiment made in xylene where precipitation of polymer or copolymer occurred immediately on polymerization. Gelation in the example with dimethylformamide could have been prevented by reducing the concentration of reactants. It could also have been prevented by preparing a polyester having a somewhat lower adduct grouping per mol content. Other solvents useful in copolymerizing acrylonitrile with a polyester include acetonitrile, dimethyl methoxy-acetamide, N-formyl morpholine and N-formyl hexamethyleneimine.

It has been found that many monomers are more reactive than styrene and require less functional polyesters to be copolymerized safely under similar reaction conditions.

In the instance of ethyl acrylate, more solvent is required than with styrene. Whereas styrene can be safely copolymerized with a polyester of about 1.7 adduct groups per molecule with only 20% solvent present, ethyl acrylate seems to show a corresponding upper limit of about 1.3. It should be noted, however, that the limits of 1–3 adduct groups per molecule holds for all suitable vinyl monomers providing the reaction mass is diluted with sufficient solvent.

*Example 43*

A copolymer made in a non-volatile solvent.

648.0 parts of adduct ester resin, as Example 1B
900.0 parts styrene
327.0 parts dibutyl phthalate
22.5 parts cumene hydroperoxide
545.0 parts dibutyl phthalate Copolymerization was carried out in the usual fashion, the peroxide being added in six equal parts at hourly intervals to the reactants at 80% concentration in dibutyl phthalate. After an additional 2 hours of holding at 150° C. ±5° C. the second portion of dibutyl phthalate was added to reduce to a practical concentration of 60% in dibutyl phthalate. The exact solids content could not be determined accurately because of the non-volatility of the solvent; the viscosity was far above Z7 on the Gardner scale. The material is useful as a printing ink vehicle where volatility must be kept to a minimum ("drying" is by absorption of the solvent into the fibers of the paper).

*Example 44*

A 25% styrene copolymer:

1470 parts adduct ester resin as Example 1B
450 parts styrene
330 parts xylene
27 parts cumene hydroperoxide Copolymerization was carried out as in Example 5, the finished copolymer resin being thinned to a theoretical 72% non-volatile by adding 250 parts xylene. The actual solids were 70.0% and the viscosity at 25° C. between Q and R (Gardner scale).

*Example 45*

A 75% styrene copolymer:

156 parts adduct ester resin such as Example 1B (96% solids in toluene; acid value 17.2)
450 parts styrene
100 parts toluene
9 parts cumene hydroperoxide
127 parts toluene Polyester, styrene and first portion of toluene (85% concentration of reactants) were held at reflux while adding the peroxide in 6 equal portions at hourly intervals. After an additional hour at 136° C. the second portion of toluene was used to thin the copolymer resin. The viscosity of the 70% non-volatile solution was far above Z7 (Gardner scale).

Example 46

Copolymer from a dihydrophthalate polyester.
A polyester resin was prepared in the usual manner from the following:

440.0 parts soya oil (0.50 mol)
51.7 parts 98% glycerol (0.55 mol)
0.17 part litharge (PbO)
112.5 parts Δ-1,4-dihydrophthalic anhydride (0.75 mol)
59.0 parts xylene The same technic was used as in the case of polyesters made from the adduct of cyclopentadiene with maleic anhydride. Esterification was continued to an acid value of 14.7 or 16.2 on the solids and an adduct grouping per mol of 1.59. The viscosity at 25° C. was 915 centistokes.

Example 47

Styrene copolymer of Example 46 polyester.

330.0 parts polyester from Example 46
300.0 parts styrene
120.0 parts xylene
9.0 parts cumene hydroperoxide Polyester and styrene were copolymerized according to the general procedure given in Example 5, followed by addition of 83 parts of xylene to thin. The following physical properties were found:

Non-volatile content _____ 68.2%
Viscosity (25° C.) _____ Between Z4 and Z5 (Gardner scale)
Color _____ 4 (Gardner)

This resin solution was a perfectly homogeneous material like the other copolymers obtained from cyclopentadiene-maleic adduct resins; it was also much like the latter in performance as a coating vehicle.

Example 48

Polyester from the cyclopentadiene adduct of fumaric acid.
A polyester was prepared from the following charge:

440.0 parts soya oil (0.50 mol)
51.7 parts 98% glycerol (0.55 mol)
0.17 part litharge
136.5 parts cyclopentadiene adduct of fumaric acid (0.75 mol)
60.0 parts xylene Esterification technic of Example 1 was followed to an acid value of 14.6 or 16.0 on solids basis and having 1.59 adduct groups per mol. Viscosity at 25° C. was 586 centistokes.

Example 49

Styrene copolymer of polyester from Example 48.

330 parts polyester from Example 48
300 parts styrene
120 parts xylene
9 parts cumene hydroperoxide The copolymerization technic of Example 5 was followed but gelation occurred at about 60% styrene conversion, indicating that the trans-delta-4-3,6-endomethylene-tetrahydrophthalic unsaturation is more reactive than the cis-delta-4-3,6-endomethylene-tetrahydrophthalic. To prevent gelation it would be necessary either to increase the solvent concentration of the copolymerization reaction or to reduce the functionality of the polyester resin or both.

Example 50

Polyester prepared from the adduct of cyclopentadiene and chlormaleic anhydride.
A polyester was prepared from the following charge:

440.00 parts soya oil (0.50 mol)
51.70 parts 98% glycerol (0.55 mol)
0.17 part litharge
49.5 parts dicyclopentadiene (0.75 equivalents)
99.5 parts chlormaleic anhydride (0.75 mol)
64.0 parts xylene The esterification technic of Example 1 was followed to an acid value of 16.6 on solids basis, resulting in a polyester having a calculated value of 1.53 adduct groups per molecule. Viscosity (25° C.) was 493 centistokes.

Example 51

Copolymer of styrene and chlormaleic adduct polyester.

330.0 parts polyester of Example 50
300.0 parts styrene
120.0 parts xylene
9.0 parts cumene hydroperoxide The copolymerization technic of Example 5 was followed yielding a copolymer solution which after the addition of 83 g. of xylene had 66.8% non-volatile and a viscosity of between T and U (Gardner scale).

It has been previously mentioned that polyesters made exclusively from conjugated fatty acids are difficult to prepare because of likelihood for gelation, particularly when reacted to a low acid number. For example in preparing a polyester by the procedure described in Example 1, but substituting an equivalent amount of dehydrated castor oil about 30 per cent of the acids present as glycerides therein being of the conjugated type, for the soya oil, a polyester was obtained which gelled when reacted to an acid number of less than 20. Moreover a sample of such polyester removed prior to gelation when reacted with styrene in the presence of a suitable solvent resulted in almost immediate gelation of the reaction mass shortly after being heated to a refluxing temperature.

By replacing a major amount of the conjugated type of fatty acids with non-conjugated fatty acids, in the preparation of an adduct polyester resin, the resultant polyester resins do not readily gel when heated per se, or in copolymerization reactions with suitable vinyl monomers. This is illustrated in the following examples wherein enough soya oil was employed in admixture with the dehydrated castor oil to reduce the amount of available conjugated type fatty acids upon ester exchange to less than 20 per cent of the total fatty acid content.

Example 52

Polyester with 7½ per cent of the fatty acid content being of the conjugated type.
A cyclopentadiene-maleic adduct polyester was prepared in accordance with the method described in Example 1 by first heating together:

330.00 parts dehydrated castor oil (0.375 mol)
990.00 parts soya oil (1.125 mols)
155.00 parts 98% glycerine (1.65 mols) and
0.52 part litharge (PbO)

to effect an ester exchange reaction. There were then added 145 parts xylene, 151 parts dicyclopentadiene (2.29 mols) and 220 parts maleic anhydride (2.25 mols) and the mixture then reacted by heating to its atmospheric refluxing temperature until a polyester was obtained having an acid number value of 15.3 and a calculated average of 1.62 cyclopentadiene maleic adduct groups per polyester molecule.

*Example 53*

Styrene copolymer made from the soya-dehydrated castor oil modified polyester of Example 52.

A styrene copolymer was prepared by heating to its atmospheric refluxing temperature a homogeneous solution consisting of the following:

324.0 parts by weight polyester from Example 52
300.0 parts by weight styrene
209.0 parts by weight xylene
9.0 parts by weight cumene hydroperoxide Copolymerization was effected by holding at atmospheric reflux (139°–144° C.) and adding the peroxide catalyst in six equal portions at hourly intervals, the batch being then held at 144° C. for an additional hour after the last increment of peroxide. The copolymer thereby obtained was a homogeneous viscous fluid having the following physical properties:

Non-volatile content _____ 68.5%
Viscosity (25° C.) _____ Z6 (Gardner scale)
Color _____ 4 (Gardner scale)

As the amount of conjugated type fatty acids employed in the preparation of adduct polyesters is still further increased, the resultant polyesters require the presence of increasingly larger amounts of solvent to prevent gelation when reacted with a suitable vinyl monomer. This is illustrated in the two subsequent examples describing preparation of an adduct polyester in which about 15 per cent by weight of the total amount of fatty acids are of the conjugated type, and the copolymerization of such polyester with styrene.

*Example 54*

A polyester was prepared employing the technic described in Example 1 with the following quantities of reactants:

660 parts by weight dehydrated castor oil (0.75 mol)
660 parts by weight soya oil (0.75 mol)
0.52 part by weight litharge (PbO)
155 parts by weight 98% glycerol (1.65 mols)
145 parts by weight xylene
151 parts by weight dicyclopentadiene (2.29 mols)
220 parts by weight maleic anhydride (2.25 mols)

The above were reacted to yield a viscous polyester having an acid number value of 15.0 (on the solids) and a calculated adduct group content per polyester molecule of 1.64.

*Example 55*

Equal weights of the polyester of Example 54 and styrene were diluted to 40 per cent concentration with xylene and then reacted by heating to its atmospheric refluxing temperature in the presence of cumene hydroperoxide in the same manner as described in Example 53. A copolymer was obtained, which by solids determination indicated over 90% of the styrene had copolymerized.

When an attempt was made to react equiamounts of styrene and the polyester of Example 54 in the presence of cumene hydroperoxide, but at the higher concentration of 72 per cent in xylene, gelation occurred after only 50 per cent of the styrene had been copolymerized.

As previously described and exemplified herein, the dibasic acids employed in preparing the polyester resins useful for copolymerization with suitable vinyl monomers can consist entirely of the Diels-Alder dibasic adducts hitherto described and represented by X in the formula. Alternatively a portion of the dibasic acids (represented by P in the formula for calculating adduct groups) can consist of dicarboxylic acids, which when esterified per se with polyhydric alcohols such as glycol, glycerol and the like, yield polyesters which are non-reactive, in the sense that no copolymerization results when they are reacted with vinyl monomers. Such dicarboxylic acids include the saturated aliphatic dicarboxylic acids having the formula $HOOC(CH_2)_nCOOH$ where $n$ is a whole number more than one, for example, adipic, succinic or sebacic. Other dicarboxylic acids which can be used for partially replacing the dibasic adducts represented by P in the formula, include phthalic acid or anhydride, or its derivatives such as chlorphthalic and homophthalic acid. Also useful in this connection are dimerized fatty acids such as dimerized linoleic acid, or the dibasic adducts such as cis- or transdelta-4-tetrahydrophthalic acid. Polyesters of the hydrogenated adduct of cyclopentadiene and maleic anhydride, 3,6-endomethylene hexahydrophthalic anhydride, also lack reactivity with vinyl monomers, and hence this acid may be used as a modifying dibasic acid.

The examples hitherto given have described copolymers containing between 25 and 75 per cent of reacted vinyl monomer and conversely 75 and 25 per cent polyester resin. This range is the most suitable when the copolymers are to be used in coating applications or vehicles. For other applications, adhesives, binders for molding material and other bonding applications, copolymers in the range between 10 and 90 per cent vinyl monomer to respectively 90 and 10 per cent polyester resin find utility. In general, the copolymers of higher vinyl content are more brittle, although the degree of brittleness varies with the specific vinyl monomers, for instance, at the same concentration, an ethyl acrylate copolymer is considerably more flexible than a styrene copolymer.

For the purposes of this application the polyesters may be prepared with either the acid or anhydride forms of the dibasic adduct, and similarly the modifying dicarboxylic acids as illustrated in the examples may be in the anhydride form, since equivalent products are obtained in either case.

What is claimed is:

1. A fusible soluble copolymer of (1) a vinyl monomer having the formula $CH_2=CHR$ where R is a group having unsaturation in conjugation with the $CH_2=CH$ group and selected from the group consisting of aryl, heterocyclic, carbalkoxy, carboxy, ketonic, nitrile and amido, and (2) a fusible polyester of a polyhydric alcohol coesterified with the fatty acids present as glycerides in fatty oils, said acids being selected from group consisting of saturated acids and unsaturated non-conjugated acids, and with a dibasic adduct selected from the group consisting of delta-1,4-dihydrophthalic acid and the Diels-Alder adducts of a diolefine selected from the group consisting of, dicyclopentadiene and cyclopentadiene and an acidic reactant selected from the group consisting of the acids and anhydrides of maleic, chloromaleic and fumaric; said polyester having a calculated fatty oil content of at least 50 per cent by weight and an average of between one and three diacyl residues of said adduct per polyester molecule.

2. A fusible soluble copolymer of (1) a vinyl monomer having the formula $CH_2=CHR$ where R is a group having unsaturation in conjugation with the $CH_2=CH$ group and selected from the group consisting of aryl, heterocyclic, carbalkoxy, carboxy, ketonic, nitrile and amido, and (2) a fusible polyester of a polyhydric alcohol coesterified with the fatty acids present as glycerides in fatty oils, said acids being selected from group consisting of saturated acids and unsaturated non-conjugated acids, and with a dibasic adduct selected from the group consisting of delta-1,4-dihydrophthalic acid and the Diels-Alder adducts of a diolefine selected from the group consisting of, dicyclopentadiene and cyclopentadiene and an acidic reactant selected from the group consisting of the acids and anhydrides of maleic, chloromaleic and fumaric; said polyester having a calculated fatty oil content of at least 50 per cent by weight and an average of between one and three adduct residues per polyester molecule and said copolymer containing between 25 and 75 per cent of the vinyl monomer copolymerized with between 75 and 25 per cent respectively of the polyester.

3. A fusible soluble copolymer of styrene and a fusible polyester of a polyhydric alcohol coesterified with the fatty acids present as glycerides in fatty oils, said acids being selected from group consisting of saturated acids and unsaturated non-conjugated acids, and with the Diels-Alder dibasic adduct of cyclopentadiene and an acidic reactant selected from the group consisting of maleic acid and maleic anhydride, said polyester having a calculated fatty oil content of at least 50 per cent by weight and an average of between one and three adduct residues per polyester molecule.

4. A fusible soluble copolymer of (1) a vinyl monomer having the formula $CH_2=CHR$ where R is a group having unsaturation in conjugation with the $CH_2=CH$ group and selected from the group consisting of aryl, heterocyclic, carbalkoxy, carboxy, ketonic, nitrile and amido, and (2) a fusible polyester of a polyhydric alcohol coesterified with (a) the fatty acids present as glycerides in fatty oils, said acids being selected from group consisting of saturated acids and unsaturated non-conjugated acids, (b) a dicarboxylic acid which when per se esterified with polyhydric alcohol yields a polyester which does not copolymerize with vinyl monomers, and (c) a dibasic adduct selected from the group consisting of delta-1,4-dihydrophthalic acid and the Diels-Alder dibasic adducts of a diolefine selected from the group consisting of, dicyclopentadiene and cyclopentadiene and an acidic reactant selected from the group consisting of the acids and anhydrides of maleic, chloromaleic and fumaric, said polyester having a calculated fatty oil content of at least 50 per cent by weight, and an average of between one and three residues of said adduct per polyester molecule.

5. A fusible soluble copolymer of (1) a vinyl monomer having the formula $CH_2=CHR$ where R is a group having unsaturation in conjugation with the $CH_2=CH$ group and selected from the group consisting of aryl, heterocyclic, carbalkoxy, carboxy, ketonic, nitrile and amido, and (2) a polyester of castor oil esterified with a dibasic adduct selected from the group consisting of delta-1,4-dihydrophthalic acid and the Diels-Alder adducts of a diolefine selected from the group consisting of, dicyclopentadiene, and cyclopentadiene and an acidic reactant selected from the group consisting of the acids and anhydrides of maleic, chloromaleic and fumaric; said polyester having a calculated fatty oil content of at least 50 per cent by weight and a calculated average of between one and three residues of said adduct per polyester molecule.

6. Coating composition comprising a solution in an organic solvent of a copolymer of styrene and a fusible polyester of a polyhydric alcohol coesterified with the fatty acids present as glycerides in soya oil and the dibasic Diels-Alder adduct of cyclopentadiene and maleic anhydride, said polyester having a calculated fatty oil content of at least 50 per cent by weight and an average of between one and three residues of said adduct per polyester molecule.

7. Process which comprises copolymerizing in solution in an organic solvent (1) a vinyl monomer having the formula $CH_2=CHR$ where R is a group having unsaturation in conjugation with the $CH_2=CH$ group and selected from the group consisting of aryl, heterocyclic, carbalkoxy, carboxyl, ketonic, nitrile and amido, and (2) a fusible polyester of a polyhydric alcohol coesterified with the fatty acids present as glycerides in fatty oils, said acids being selected from group consisting of saturated acids and unsaturated non-conjugated acids and with a dibasic adduct selected from the group consisting of delta-1,4-dihydrophthalic acid and the Diels-Alder adducts of a diolefine selected from the group consisting of, dicyclopentadiene and cyclopentadiene and an acidic reactant selected from the group consisting of the acids and anhydrides of maleic, chloromaleic and fumaric, said polyester having a calculated fatty oil content of at least 50 per cent by weight and an average of between one and three residues of said adduct per polyester molecule, said solvent being a solvent for the resultant copolymer and being present during the copolymerization reaction in amount preventing gelation of the reactants, said amount being between about 10 and 90 per cent by weight of the reactants.

8. Process according to claim 7 for copolymerizing a vinyl monomer and a polyester, in which the copolymerization reaction is accelerated by incorporating a peroxide catalyst in the reaction mixture.

9. Process for copolymerizing styrene and a polyester which comprises heating to about refluxing temperatures a solution in a volatile organic solvent of between 75 and 25 parts by weight of styrene and between 25 and 75 parts respectively of a fusible polyester being the coesterification product of a polyhydric alcohol with the fatty acids present as glycerides in fatty oils, said acids being selected from group consisting of saturated acids and unsaturated non-conjugated acids, and the dibasic Diels-Alder adduct of cyclopentadiene and maleic anhydride, said polyester having a calculated fatty oil content of at least 50 per cent by weight and an average of between one and three residues of said adduct per polyester molecule, said solvent being also a solvent for the resultant copolymer and being present during the copolymerization reaction in amount preventing gelation of the reactants, said amount being between about 10 and 90 per cent by weight of the reactants.

10. Process which comprises copolymerizing a vinyl monomer and a fusible fatty oil modified polyester by heating a solution of the monomer and polyester in an organic solvent which is a solvent for the resultant copolymer, said vinyl monomer having the formula $CH_2=CHR$ where R is a group having unsaturation in conjugation with the $CH_2=CH$ group and selected from the group consisting of aryl, heterocyclic, carbalkoxy, carboxy, ketonic, nitrile, and amido, and said polyester comprising a polyhydric alcohol coesterified with (1) a mixture of fatty acids present as glycerides in fatty oils, said mixture containing not more than 20 per cent by weight of conjugated fatty acids (2) a dibasic adduct selected from the group consisting of delta-1,4-dihydrophthalic anhydride and the Diels-Alder adducts of a diolefine selected from the group consisting of, dicyclopentadiene and cyclopentadiene and an acidic reactant selected from the group consisting of the acids and anhydrides of maleic, chloromaleic and fumaric, said polyester having a calculated fatty oil content of at least 50 per cent by weight and an average of between one and three residues of said adduct per polyester molecule.

11. A coating composition comprising in solution in an organic solvent a copolymer of 40 to 60 per cent by weight of styrene and 60 to 40 per cent respectively of a fatty oil modified polyester of a polyhydric alcohol coesterified with (1) the fatty acids present as glycerides in fatty oils, said acids being selected from group consisting of saturated acids and unsaturated non-conjugated acids, (2) phthalic anhydride and (3) the Diels-Alder dibasic adduct of cyclopentadiene and an acidic reactant selected from the group consisting of maleic acid and maleic anhydride, said polyester having a calculated fatty oil content of at least 50 per cent by weight and an average of between one and three diacyl residues of said adduct per polyester molecule.

12. A fusible soluble copolymer of an alkyl acrylate and a fusible fatty oil modified polyester of a polyhydric alcohol coesterified with the fatty acids present as glycerides in fatty oils, said acids being selected from group consisting of saturated acids and unsaturated non-conjugated acids, and with a dibasic adduct selected from the group consisting of delta-1,4-dihydrophthalic acid and the Diels-Alder adducts of a diolefine selected from the group consisting of, dicyclopentadiene and cyclopentadiene and an acidic reactant selected from the group consisting of the acids and anhydrides of maleic, chloromaleic and fumaric, said polyester having a calculated fatty oil content of at least 50 per cent by weight and an average of between one and three residues of said adduct per polyester molecule.

JOHN WYNSTRA.

REFERENCES CITED

The following references are of record in the file of this patent:

UNITED STATES PATENTS

| Number | Name | Date |
|---|---|---|
| 2,392,710 | Wakeford et al. | Jan. 8, 1946 |
| 2,397,240 | Bulter | Mar. 26, 1946 |
| 2,475,731 | Weith | July 12, 1949 |